US 8,519,855 B2

(12) United States Patent
Hsu

(10) Patent No.: US 8,519,855 B2
(45) Date of Patent: Aug. 27, 2013

(54) ELECTRIC RECEPTACLE APPARATUS WITH REPLACEABLE PROTECTION MODULE

(75) Inventor: Jung-Hui Hsu, New Taipei (TW)

(73) Assignee: Powertech Industrial Co., Ltd., New Taipei (TW)

( * ) Notice: Subject to any disclaimer, the term of this patent is extended or adjusted under 35 U.S.C. 154(b) by 343 days.

(21) Appl. No.: 13/070,207

(22) Filed: Mar. 23, 2011

(65) Prior Publication Data

US 2012/0161973 A1      Jun. 28, 2012

(30) Foreign Application Priority Data

Dec. 22, 2010   (TW) ............................... 99145309 A

(51) Int. Cl.
*G08B 17/00*           (2006.01)
(52) U.S. Cl.
USPC ........................................................ 340/584
(58) Field of Classification Search
USPC .......... 340/584, 588, 589, 657, 815.4; 439/1, 439/56
See application file for complete search history.

(56) References Cited

U.S. PATENT DOCUMENTS

| | | | | |
|---|---|---|---|---|
| 4,867,701 A * | 9/1989 | Wiand | .......................... | 439/501 |
| 6,454,584 B1 * | 9/2002 | Milan | .......................... | 439/214 |
| 6,755,676 B2 * | 6/2004 | Milan | .......................... | 439/214 |
| 7,510,426 B2 * | 3/2009 | Hwang et al. | ............... | 439/501 |
| 7,607,928 B2 * | 10/2009 | Schriefer et al. | .............. | 439/214 |
| 2010/0090851 A1 * | 4/2010 | Hauser | .......................... | 340/657 |
| 2010/0165530 A1 * | 7/2010 | Lee et al. | ..................... | 361/91.2 |

* cited by examiner

*Primary Examiner* — Phung Nguyen
(74) *Attorney, Agent, or Firm* — Li & Cai Intellectual Property (USA) Office

(57) ABSTRACT

An electric receptacle apparatus with a replaceable protection module is disclosed. The electric receptacle apparatus includes a receptacle module and a protection module. The receptacle module has a body, am accommodation portion, a power input interface and a power output interface. The accommodation portion is installed inside the body and has a plurality of conductive jacks, wherein the conductive jacks are electrically connected with power input interface and the power output interface respectively. The protection module has a casing, a switch unit, a protection circuit and a plurality of conductive terminals, wherein the switch unit connects with protection circuit and the conductive terminals. Whereby, when the protection module is recessed in the accommodation portion, the conductive terminals are plugged in the conductive jacks and the switch unit controls the power input interface to be electrically connected with or electrically disconnected from the power output.

17 Claims, 9 Drawing Sheets

ELECTRIC RECEPTACLE APPARATUS WITH REPLACEABLE PROTECTION MODULE

BACKGROUND OF THE INVENTION

1. Field of the Invention

The present disclosure relates to an electric receptacle apparatus, especially to an electric receptacle apparatus with a protection module.

2. Description of Related Art

A conventional electric receptacle apparatus integrated a switch unit has a key or a press-button disposed on the electric receptacle apparatus for receiving an outside manual operation from a user. The switch unit is configured to control an output port of the electrical receptacle apparatus to start to output a power or stopping outputting the power from an input port. The electric receptacle apparatus may receive an unusual peak voltage such as a surge from the input port when the switch unit is changed the operation state every time. As a result, the surge will make the switch unit be operated in an excessive temperature or damage an electronic product plugged in the electric receptacle apparatus.

One conventional solving method is using a surge absorber disposed between the switch unit and the electric receptacle apparatus for reducing the damage and improving the lifetime of the electric receptacle apparatus and the electronic product. However, the temperature of the surge absorber will increase when the surge absorber receives the surge. The excessive temperature may cause the surge absorber to be disabled or be on fire. Therefore, the capacity of the surge absorber is finite or the lifetime of the surge absorber is finite.

In general, the user may throw away the whole electric receptacle apparatus when the surge absorber has damaged. That will increase the economic cost of the electric receptacle apparatus and reduce the use efficiency of the electric receptacle apparatus. Otherwise, the user may spent time to make a professional responsible for replacing the surge absorber. It is inconvenient for the user and the damage condition of the switch unit may be ignored.

SUMMARY OF THE INVENTION

An exemplary embodiment according to the present disclosure describes an electric receptacle apparatus.

The electric receptacle apparatus disclosed in one embodiment of the present disclosure includes a receptacle module and a protection module. The protection module is detachably recessed in the electric receptacle apparatus. The receptacle module has a body, an accommodation portion, a power input interface and a power output interface. The power input interface is configured to receive a power and the power output interface is configured to output the power. The power input interface and the power output interface are disposed on the body. The accommodation portion is installed inside the body and the accommodation portion has a plurality of conductive jacks. The conductive jacks are electrically connected with the power input interface and the power output interface. The protection module has a casing, a switch unit, a protection circuit and a plurality of conductive terminals. The protection circuit is installed in the casing for protecting an electrical device plugged in the power output interface. The switch unit is connected with the protection circuit and the conductive terminals. When the protection module is recessed in the accommodation portion, the conductive terminals are plugged in the conductive jacks and the switch unit controls the power input interface to be electrically connected with or electrically disconnected from the power output interface for controlling the power output interface to star to output the power or stop outputting the power.

According to another exemplary embodiment of the present disclosure, an electric receptacle apparatus is provided. The electric receptacle apparatus comprises a receptacle module and a protection module. The protection module is detachably recessed in the receptacle module. The receptacle module has an accommodation portion. The accommodation has a plurality of conductive jacks coupled with a power input interface and a power output interface. The protection module has a plurality of conductive terminals coupled with a switch and a surge absorber device. The conductive terminals protrude from the inside to the outside of the casing of the protection module. The conductive terminals are plugged in the conductive jacks respectively when the protection module is recessed in the accommodation portion.

According to still another exemplary embodiment of the present disclosure, an electric receptacle apparatus is presented. The electric receptacle apparatus includes a receptacle module and a protection module. The receptacle module has an accommodation portion. The accommodation portion has a plurality of conductive jacks coupled with a power input interface and a power output interface. The protection module has a plurality of conductive terminals and a pyrocondensation belt. The conductive terminals are electrically coupled with a switch unit and a surge absorber device. The pyrocondensation belt is connected with the surge absorber device and an insulating member. The conductive terminals protrude from the inside to the outside of the casing of the protection module. When the protection module is recessed in the accommodation portion, the conductive terminals are plugged in the conductive jacks. When the shrinkage degree of the pyrocondensation belt develops enough to drive the insulating member to block the switch unit from being operated in the on state for stopping the power output interface outputting the power.

As mentioned above, the exemplary embodiments according to the present disclosure relate to the electric receptacle apparatus capable of providing a convenient module for the user to replace the modulized protection module. In particular, once the protection module is failed, the protection module could not be revived unless replaced by the user. The protection circuit would be replaced together with the protection module, so as to provide more safe protection for the electric receptacle apparatus.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1A:
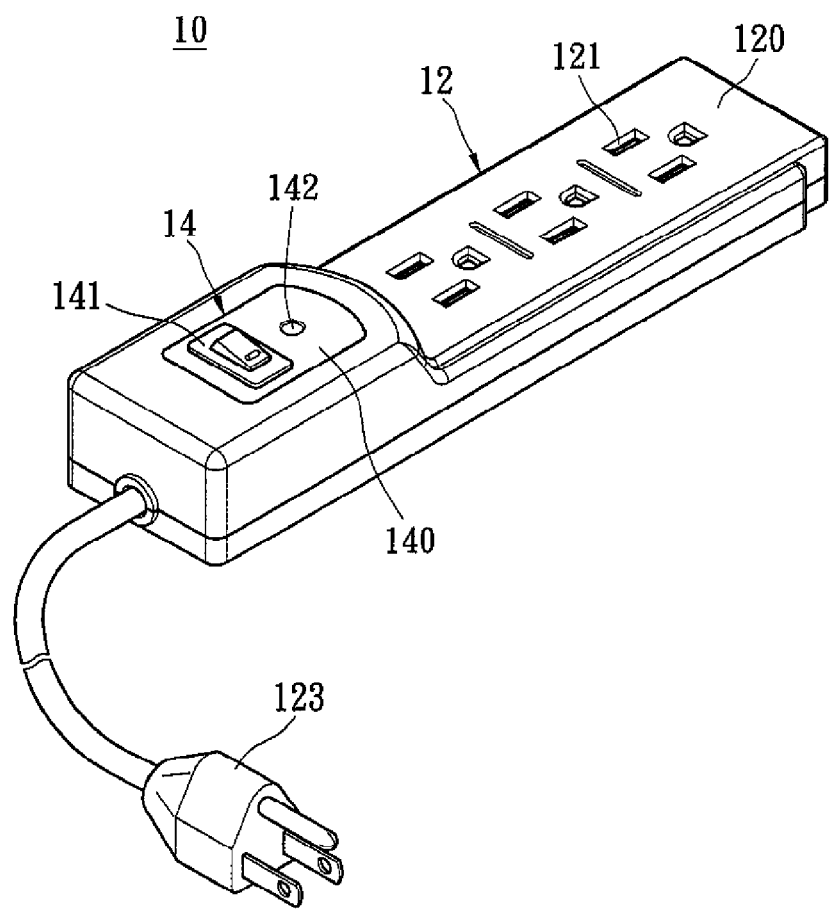
FIG. 1A is a schematic diagram of an electric receptacle apparatus according to a first exemplary embodiment of the present disclosure.

Refer to FIG. 1A. FIG. 1A illustrates a schematic diagram of an electric receptacle apparatus according to a first exemplary embodiment of the present disclosure. The electric receptacle apparatus with replaceable protection module 10 comprises a receptacle module 12 and a protection module 14. FIG. 1A illustrates the protection module 14 is recessed in the receptacle module 12.

Figure 1B:
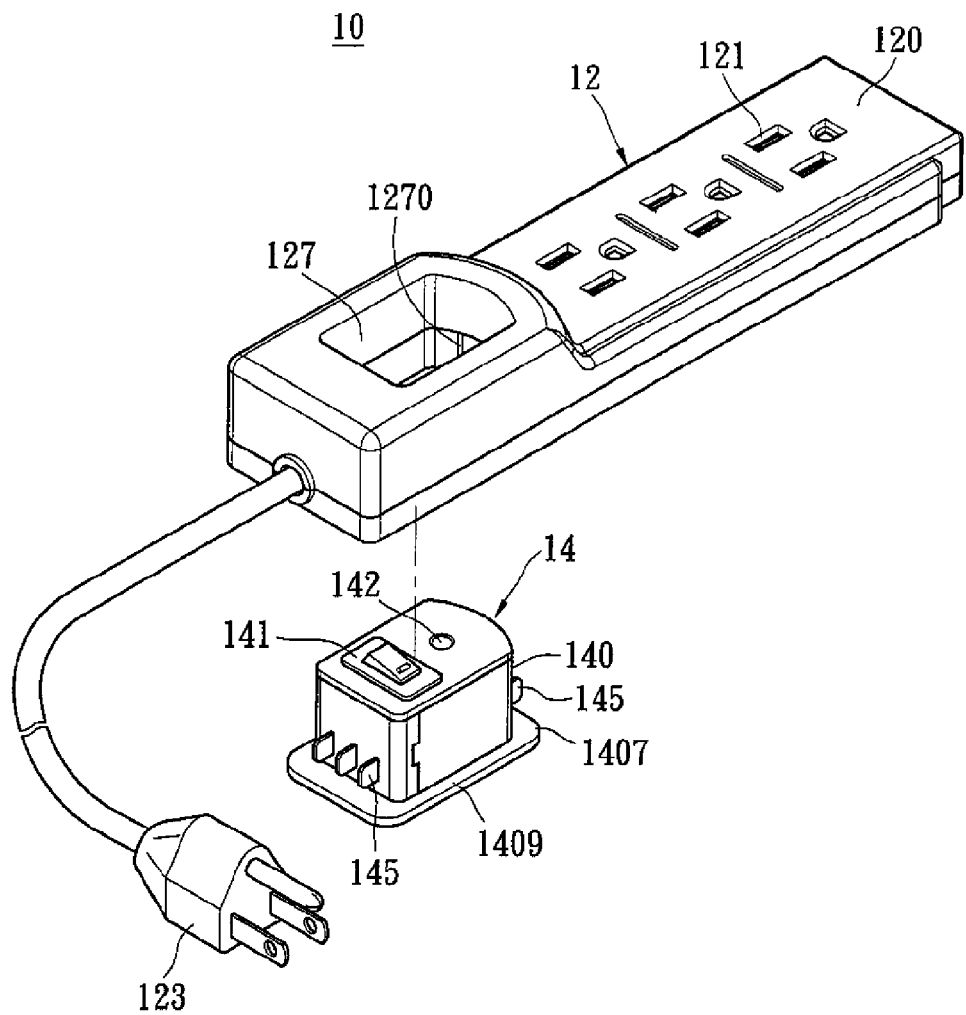
FIG. 1B is another schematic diagram of the electric receptacle apparatus according to the first exemplary embodiment of the present disclosure.

Please refer to FIG. 1A and associated with FIG. 1B. FIG. 1B illustrates another schematic diagram of the electric receptacle apparatus according to the first exemplary embodiment of the present disclosure. In one complementation, the protection module 14 is connected with or separated from the receptacle module 12 alternatively.

The receptacle module 12 includes a body 120, a power output interface 121, power input interface 123 and an accommodation portion 127. The protection module 14 has a casing 140, a switch unit 141, a plurality of conductive terminals 145 and an indicating unit 142. The protection module 14 comes with a built-in protection circuit (not shown) in the casing 140. The power output interface 121 and the power input interface 123 are disposed on the casing 120. The accommodation portion 127 is installed in the body 120. The accommodation portion 127 may be a recess penetrated the body 20. The protection module 14 is detachably recessed in the accommodation portion 127. When the protection module 14 is recessed in the accommodation portion 127, the power input interface 123 may deliver the power to the power output interface 121.

In one complementation, the receptacle module 12 may be a power strip. The power input interface 123 may be an AC electric plug with a power cord for receiving an AC power by plugging in the wall type socket or power supply. The power output interface 121 may be at lease one AC power jack for outputting the AC power to an electrical device plugged in the power output interface 121. The lateral surface of the accommodation portion 127 has a plurality of conductive jacks 1270. The conductive jacks 1270 are coupled with the power input interface 123 and the power output interface 121.

The switch unit 141 is coupled with the protection circuit, and the switch unit 141 and the protection circuit are coupled with the conductive terminals 145 respectively. The switch unit 141 is configured to alternate electrical connection and electrical disconnection between the power input interface 123 and the power output interface 121 according to the outer manual operation from the user when the protection module 14 is recessed in the accommodation portion 127. The conductive terminals 145 are configure to be plugged in the conductive jacks 1270 when the protection module 14 is recessed in the accommodation portion 127. The indicating unit 142 is configured to present the condition of the protection circuit.

In one complementation, the switch unit 141 may a key or a pressing button, the conductive terminals 145 may be a plurality of metal pieces such as copper pieces, and the indicating unit 142 may be a display panel or a light bulb. The indicating unit 142 may be integrated in the protection circuit in the casing 140. The switch unit 141, the conductive terminals 145 and indicating unit 142 protrude from the inside of the casing 140 to the outside of the casing 140.

When the protection module 14 is recessed in the accommodation portion 127, the casing 140 is jointed with the body 120 tight, the conductive terminals 145 are also recessed in the accommodation portion 127, and the conductive terminals 145 are plugged in the conductive jacks 1270 respectively. The conductive terminals 145 are electrically connected with the power input interface 123 and the power output interface 121 via the conductive jacks 1270. Whereby, the power input interface 123 is coupled with the power output interface 121 via the switch unit 141 and the protection circuit. When the protection module 14 is separated from the receptacle module 12, the power input interface 123 is not connected with the power output interface 121 and the receptacle module 12 does not supply the power.

In one complementation, when the conductive terminals 145 are plugged in the conductive jacks 1270, the conductive terminals 145 may be clipped flexibly by the conductive jacks 1270. Whereby, the protection module 14 may be disposed in the accommodation portion 127 firmly.

The switch unit 141 may be operated in the on state and the off state alternatively for changing electrical connection or electrical disconnection between the power input interface 123 and the power output interface 121. When the switch unit 141 is operated in the on state, the power input interface 123 is electrically connected with the power output interface 121 and the power output interface 121 may output the power from the power input interface 123. When the switch unit 141 is operated in the off state, the power input interface 123 is electrically disconnected with the power output interface 121 and the power output interface 121 could not output the power.

When the switch unit 141 is operated in the on state, the protection circuit may absorb the surge from the power input interface 123 for protecting the electrical device plugged in the power output interface 121 from the surge. When the switch unit 141 is operated in the off state, the protection circuit does not work.

Therefore, the protection module 14 may be removed from the receptacle module 12 when the protection circuit is disabled. The user may replace the protection module 14 by another new one. It is worthy to notice that, the protection circuit is replaced together with the protection module 14, so as to avoid ignoring the damage condition of the interior contacts of the switch unit 141.

In one complementation, the indicating unit 142 may be the light bulb, and the indicating unit 142 has different brightness according to the condition of the protection circuit. For example, the indicating unit 142 is bright when the protection circuit is operated in the working state. The indicating unit 142 is dark when the protection circuit is operated in the non-working state. If the indicating unit 142 is bright when the switch unit 141 is operated in the on state, it represents the protection circuit is failed. Therefore, the indicating unit 141 is configured to prompt the user to replace the protection module 14. In practice, there is no restriction on the type of the indicating unit 141, and the indicating unit 141 may represent the condition of the protection circuit by voice.

In particular, the bottom plate 1407 of the casing 140 has a flange 1409. When the bottom plate 1407 is contacted with the body 120, the flange 1409 may cover the conductive terminals 145 and protect the conductive terminals 145 against affect from the outside of the casing 140.

Figure 1C:
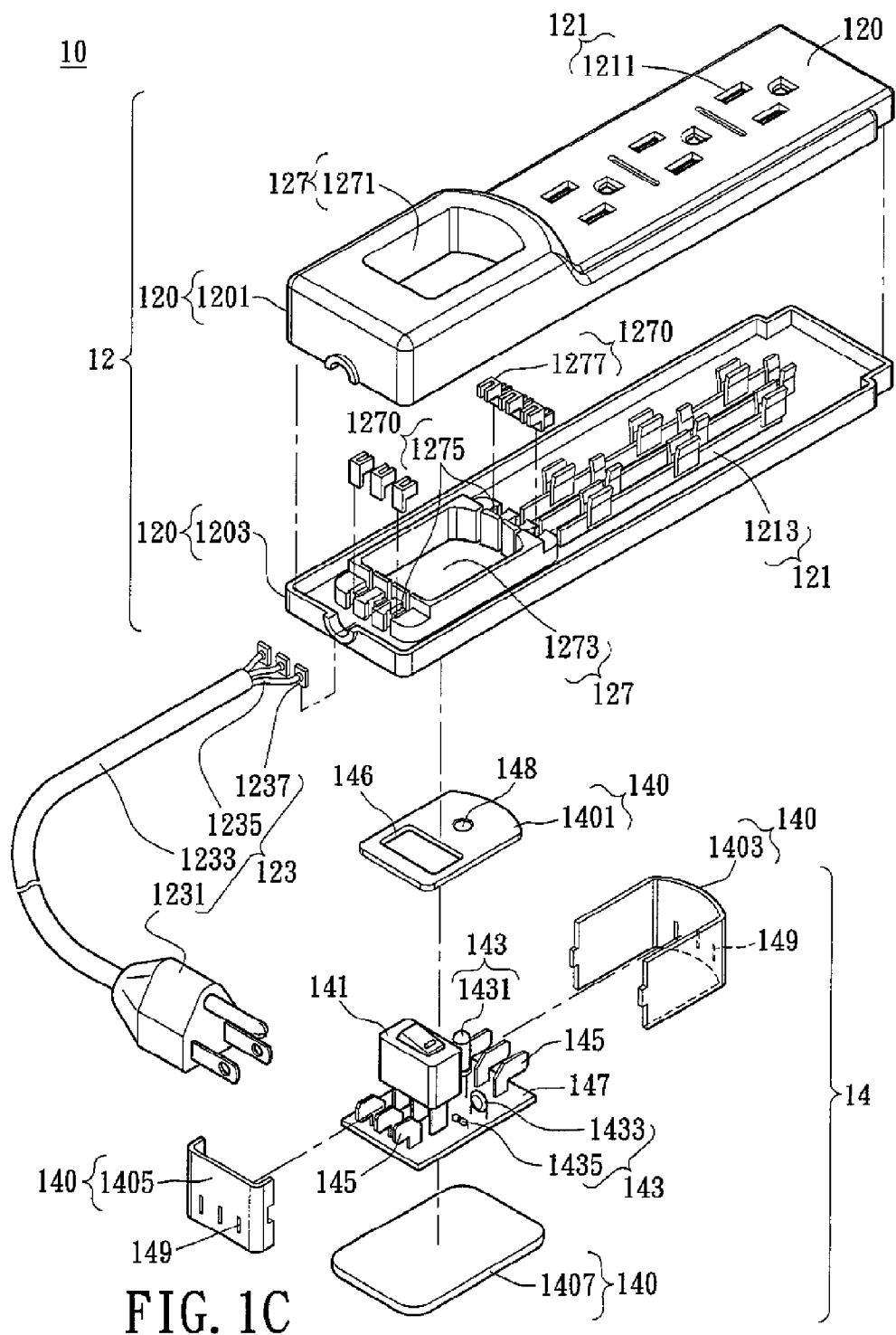
FIG. 1C is another schematic diagram of the electric receptacle apparatus according to the first exemplary embodiment of the present disclosure.

Please refer to FIG. 1C. FIG. 1C illustrates an explosion diagram of the electric receptacle apparatus according to the first exemplary embodiment of the present disclosure.

The body 120 includes a cover plate 1201 and a base 1203. The accommodation portion 127 includes an upper accommodation portion 1271 and a lower accommodation portion 1273. The power input interface 123 includes a plug 1231, a cable 1233 and a plurality of conductive contact points 1237. Each of the conductive jacks 1270 includes a channel 1275 and a contact plate 1277. The power output interface 121 includes the receptacle jacks 1211 and a plurality of conductive plates 1213.

In one complementation, the contour of the cover plate 1201 may be similar with the contour of the base 1203. The position on the cover plate 1201 where the upper accommodation portion 1271 is disposed is corresponding to the position on the base 1273 where the lower accommodation portion 1273 is disposed.

The cable 1233 protrudes from the inside of the body 120 to the outside of the body 120, and the cable 1233 is electrically connected with the plug 1231. The cable 1233 includes a plurality of electric wires 1235, and the electric wires 1235 are wrapped in an insulating layer (not shown). The electric wires 1235 are electrically connected with the plug 1231, and the portions of the electric wires 1235 exposed from the insulating later are electrically connected with the conductive contact points 1237. In one complementation, the conductive contact points 1237 are disposed on the lateral surface of the base 1203, and the conductive contact points 1237 are welded on the base 1203 via the solders or adhered to the base 1203 via resin.

The receptacle jacks 1211 of the power output interface 121 are disposed on the cover plate 1201. The conductive plates 1213 are disposed on the base 1203. In one complementation, the positions on the base 1203 where the conductive plates 1213 are disposed are corresponding with the positions on the cover plate 1201 where the receptacle jacks are disposed. The conductive plates 1213 may contact with the plug of the electrical device plugged in one of the receptacle jacks 1211.

In one complementation, the channels 1275 may be a plurality of slots disposed on the base 1203 with equal intervals. The channels 1275 are extended from the lateral surface of the accommodation portion 127 to the inside of the base 1203. The size of the channels 1275 are similar with the conductive contact points 145 and the channels 1275 allow the conductive terminals 145 to pass through.

The conductive contact plates 1277 may be a plurality of metal clips for clipping the conductive terminals 145 passing through the channels 1275. The number of the conductive contact plates 1277 is consistent with the number of the conductive terminals 145. The conductive contact plates 1277 are disposed in the lateral surface of the channels 1275 respectively. The conductive contact plates 1277 are connected with conductive contact points 1237 and the conductive plates 1213.

The conductive jacks 1270 may be disposed on one lateral surface or two lateral surfaces of the lower accommodation portion 1273. FIG. 1C illustrates the conductive jacks 1270 are disposed on two lateral surfaces of the lower accommodation portion 1273. The conductive jacks 1270 disposed on one lateral surface of the lower accommodation portion 1273 adjacent to the power input interface 123 allow the conductive terminals 145 to be connected with the power input interface 123. The conductive jacks 1270 disposed on another lateral surface of the lower accommodation portion 1273 adjacent to the power output interface 121 allow the conductive terminals 145 to be connected with the power output interface 121.

In one complementation, the casing 140 of the protection module 14 includes a top plate 1401, the lateral plates 1403, 1405, and a bottom plate 1407. The top plate 1401, the lateral plates 1403, 1405 and the bottom plate 1407 compose of a lid, and the lid has a hollow space. When the protection module 14 is recessed in the accommodation portion 127, the conductive terminals 145 are clipped by the contact plates 1277. Therefore, the lid may be disposed in the accommodation portion 127 firmly and the bottom plate 1407 is contacted with the base 1203.

The top plate 1401 has a first opening 146 and a second opening 148. The lateral plates 1403, 1405 have a plurality of perforations 149. The protection module 14 has a circuit board 147 disposed on the bottom plate 1407. The switch unit 141, the protection circuit 143 and the conductive terminals 145 are disposed on the circuit board 147. In particular, the conductive terminals 145 are protruded horizontally from the lateral plates 1403, 1405 with respect to the bottom plate 1407.

In one complementation, the protection circuit 143 includes a light-emitting device 1431, a surge absorber device 1433 and a thermal protection device 1435. The surge absorber device 1433 is configured to absorber the surge from the power input interface 123. When the temperature of the surge absorber device reaches a critical temperature which the surge absorber device 1433 is failed, the thermal protection device 1435 melts for preventing the surge absorber device 1433 from being on fire. After the thermal protection device 1435 is melted, the thermal protection device 1435 may block the switch unit 141 from being operated in the on state and could not be revived.

The light-emitting device 1431 is configured to be the indicating unit 142 as shown in FIG. 1A. The light-emitting device 1431 may emit while the protection circuit 143 is operated on the working state. The light-emitting device 1431 may not emit light while the temperature of the surge absorber device 1433 reaches the critical temperature.

The surge absorber device 1433 may be a metal oxide varistor (MOV). The light-emitting device 1431 may be a light-emitting diode.

The switch unit 141 protrudes from the inside of the casing 140 to the outside surface of the casing 140 via the first opening 146. The light-emitting device 1431 protrudes from the inside of the casing 140 to the outside surface of the casing 140 via the second opening 148. The number of the perforations 149 is consistent with the number of the conductive terminals 145. The conductive terminals 145 protrude from the inside of the casing 140 to the outside surface of the casing 140 via the perforations 149.

In particular, the switch unit 141 and the protection circuit 143 are integrated in the circuit board 147. It may improve the protection circuit 147 usage and save the protection circuit 147. Moreover, while the protection circuit 143 is operated on the non-working state, the electric receptacle apparatus with replaceable protection module 10 would be power off automatically and the switch unit 141 would also be invalid. The switch unit 141 should be replaced together with the protection circuit 143, so as to avoid ignoring the damage condition of the interior contacts of the switch unit 141.

Figure 2A:
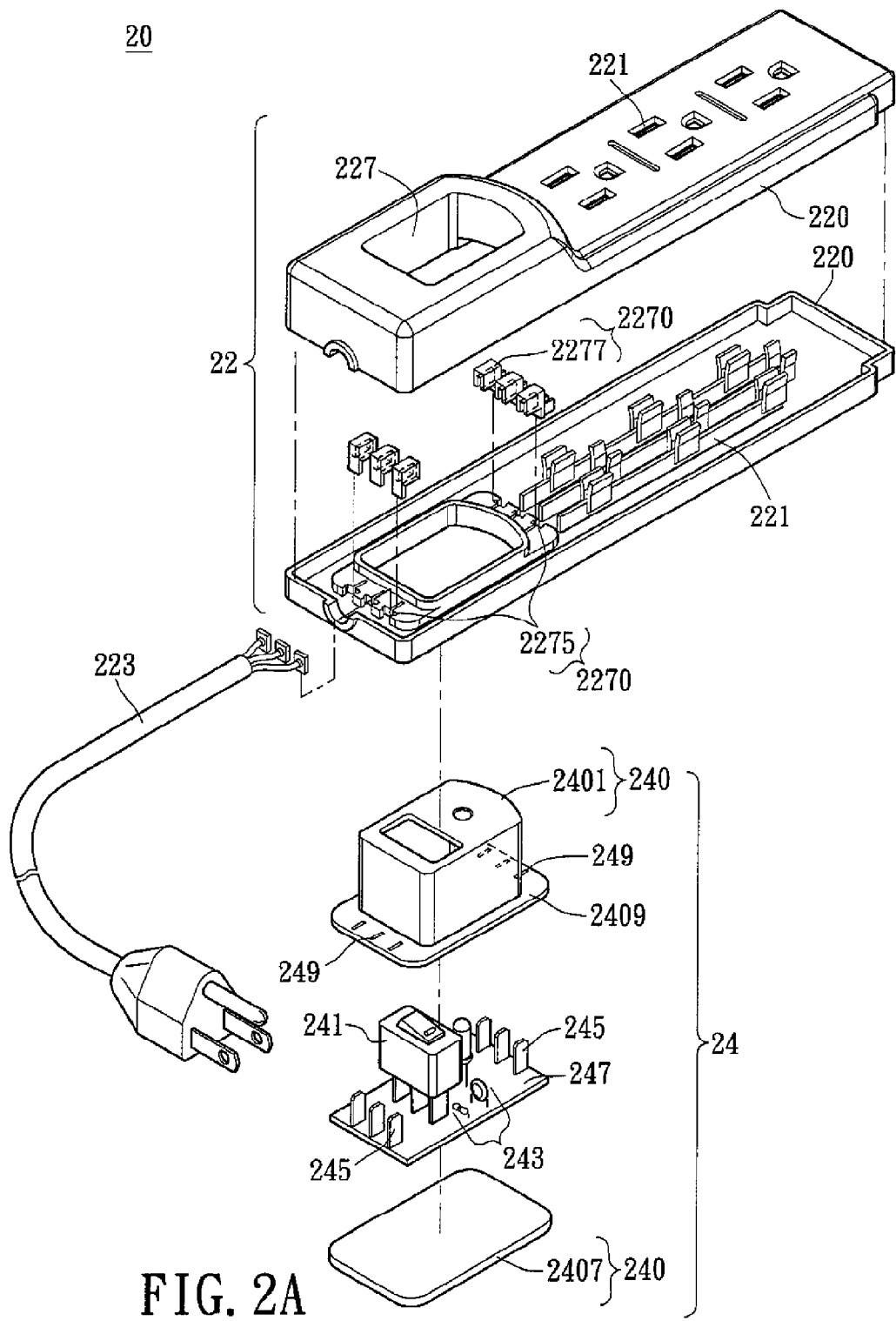
FIG. 2A is a schematic diagram of an electric receptacle apparatus according to a second exemplary embodiment of the present disclosure.

Please refer to FIG. 2A. FIG. 2A illustrates a schematic diagram of an electric receptacle apparatus according to a second exemplary embodiment of the present disclosure.

The electric receptacle apparatus with the replaceable protection module 20 and the electric receptacle apparatus with the replaceable protection module 10 are roughly the same. The difference between them is the conductive terminals 245 of the electric receptacle apparatus with the replaceable protection module 20 are protruded perpendicularly from the casing 240. The channels 2275 may be a plurality of through holes. The through holes extend from the bottom of the accommodation portion 227 to the inside of the casing 240.

The casing 240 includes a lid 2401 and a bottom plate 2407. The lid 2401 and the bottom plate 2407 compose a hollow recess. In particular, the bottom of the lid 2401 has a flange 2409. The flange 2409 has a plurality of perforations 249. The conductive terminals 245 may pass through the perforations 249 and the conductive terminals 245 are protruded perpendicularly from the lid 2401 with respect to the bottom plate 2407.

The conductive terminals 245 are passing through the channels 2275 and clipped by the contact plates 2277 while the protection module 24 is recessed in the accommodation portion 227 of the receptacle module 22. The power input interface 223 is coupled with the power output interface 221 via the switch unit 241 and the protection circuit 24. The switch unit 241 is operated in the on state and the off state alternatively. The power input interface 223 is electrically connected with the power output interface 221 while the switch unit 241 is operated in the on state. The power input interface 223 is disconnected with the power output interface 221 while the switch unit 241 is operated in the off state.

Figure 2B:
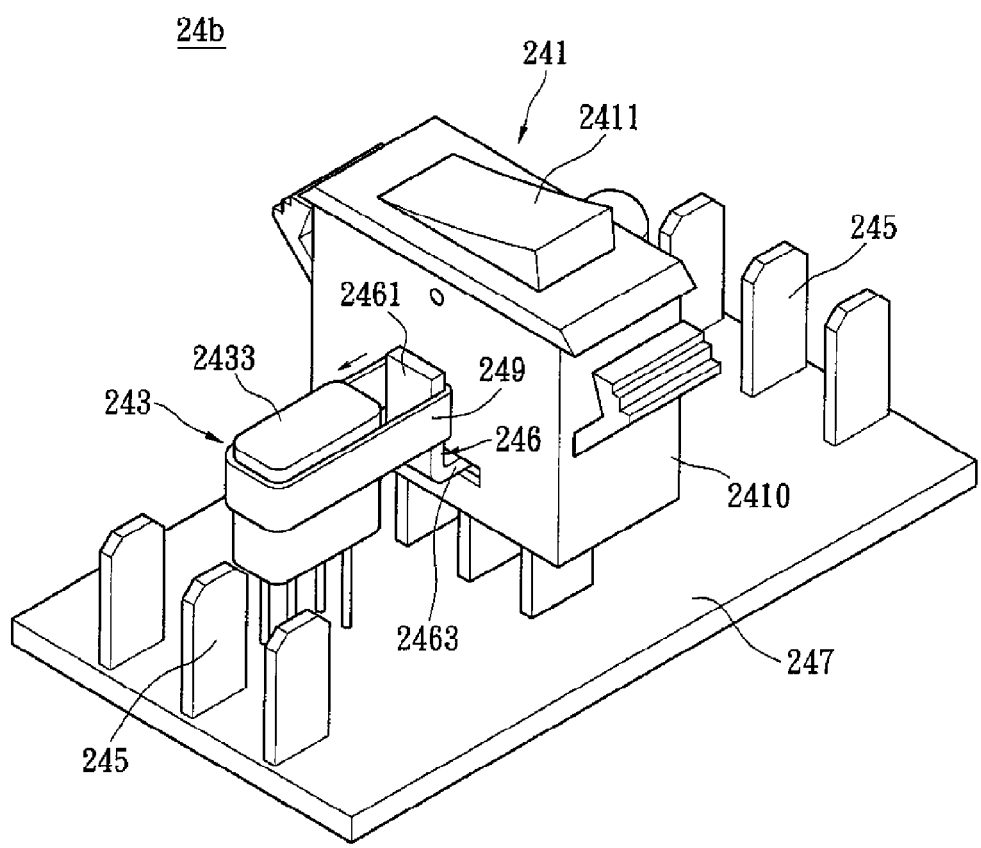
FIG. 2B is a schematic diagram of a protection module of the electric receptacle apparatus according to an exemplary embodiment of the present disclosure.

Please refer to the FIG. 2B. FIG. 2B is a schematic diagram of a protection module of the electric receptacle apparatus according to an exemplary embodiment of the present disclosure.

The casing 140 or 240 are omitted in FIG. 2B. In practice, the protection module 24b is disposed in the casing 140 or 240, and the casing 140 or 240 are recessed in the receptacle module 12 detachably.

Protection module 24b includes the switch unit 241, the protection circuit 243, the pyrocondensation belt 249, the conductive terminals 245, the insulating member 246 and the circuit board 247. The switch unit 241, the protection circuit 243 and the conductive terminals 245 are electrically connected with each other and disposed on the circuit board 247. In particular, the switch unit 241 is adjacent to the protection circuit 243. The insulating member 246 is set on the switch unit 241. The pyrocondensation belt 249 is connected to the protection circuit 243 and the insulating member 246. The protection circuit 243 in FIG. 2B is taken the surge absorber device 2433 for example.

The switch unit 241 includes a box 2410 and an operation section 2411. The operation section 2411 is pivotally connected to the box 2410. The insulating member 246 includes a push-pull lever 2461 and an extension portion 2463. The extension portion 2463 extends from the outside of the box 2410 to the inside of the box 2410. The surge absorber device 2433 may be wrapped with an insulating material such as silicon resin. The surge absorber device 2433 has two pins protruded from the insulating material. The pyrocondensation belt 249 is connected to the push-pull lever 2461 and the surge absorber device 2433.

The technical feature of this embodiment of the present invention is that the pyrocondensation belt 249 would shrink according to the heat conduction from the surge absorber device 2433 when the protection module 24b is operated in the on state. When the shrinkage of the pyrocondensation belt 249 develops enough to drive the extension portion 2463 of the insulating member 246 to block the connection between the interior contact points of the switch unit 241, so as to transfer the operation state of the switch unit 241 from the on state to the off state. Therefore, the switch unit 241 may be operated in the off state before the surge absorber device 2433 is on fire.

It is worthy to notice that, the moving of the insulating member 246 is irreversible because the shrinkage of the pyrocondensation belt 249 is irreversible. As the result, the operation section 2411 is invalid to change the electrically connection or disconnection of the interior contacts of the switch unit 241. In other words, the electric receptacle apparatus with replaceable protection module 10 or 20 would be power off automatically while the temperature of the surge absorber device 2433 reaches the critical temperature which the surge absorber device 2433 failed. The electric receptacle apparatus with replaceable protection module 10 or 20 would be enable after the protection module 24b is replaced for another new one.

In particular, the switch unit 241 may be a rocker switch or a push-pull switch. There is no restriction on the structure of the switch unit 241, and the control principle between the operation section 2411 and the switch unit 241 is not restricted.

The shape and the structure of insulating member 246 are not restricted in FIG. 2B. The material of the insulating member 246 may has good heat resistance and high tensile strength. The position on the box 2410 where the insulating member 246 is disposed may be adjacent to the surge absorber device 2433. In other words, the surge absorber device 2433 and the insulating member 246 are disposed on the same side of the box 2410. The pyrocondensation belt 249 may be a pyrocondensation strip or a pyrocondensation sleeve. If the pyrocondensation belt 249 is the pyrocondensation strip, the pyrocondensation belt 249 is connected to the surge absorber device 2433 and the push-pull lever 2461 of the insulating member 246 via the resin. If the pyrocondensation belt 249 is the pyrocondensation sleeve, the pyrocondensation belt 249 encircles the surge absorber device 2433 and the insulating member 246.

When the temperature of the surge absorber device 2433 does not reach the critical temperature, the pyrocondensation belt 249 does not shrink and there is a gap between the surge absorber device 2433 and the insulating member 246. The insulating member 246 does not affect the operation of the switch unit 241 while the pyrocondensation belt 249 does not shrink. When the temperature of the surge absorber device 2433 reaches the critical temperature and the temperature of the pyrocondensation belt 249 meets the operating temperature, the shrinkage of the pyrocondensation belt 249 may force the push-pull lever 2461 to be moved or be bent forward to the surge absorber device 2433, so as to drive the extension portion 2463 to block the connection of the interior contacts of the switch unit 241.

Figure 2C:
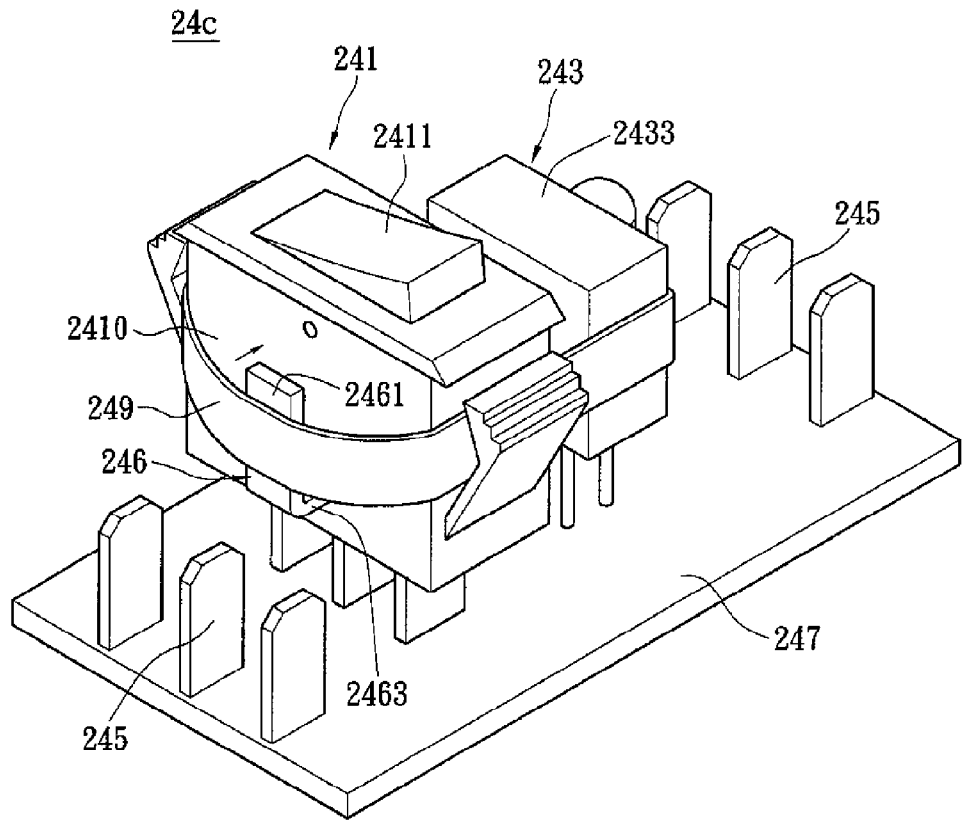
FIG. 2C is a schematic diagram of a protection module of the electric receptacle apparatus according to another exemplary embodiment of the present disclosure.

Please refer to FIG. 2C. FIG. 2C a schematic diagram of a protection module of the electric receptacle apparatus according to another exemplary embodiment of the present disclosure.

The protection module 24c and the protection module 24c are roughly the same. The difference between them is the surge absorber device 2433 and the insulating member 246 are disposed on the different side of the box 2410. The pyrocondensation belt 249 is connected to the surge absorber device 2433, the insulating member 246 and the switch unit 241.

In practice, the operating temperature and the shrinkage rate of the pyrocondensation belt 249 is selected according to the critical temperature of the surge absorber device 2433. For example, the maximum of the operating temperature is chosen to equal to the critical temperature.

Figure 2D:
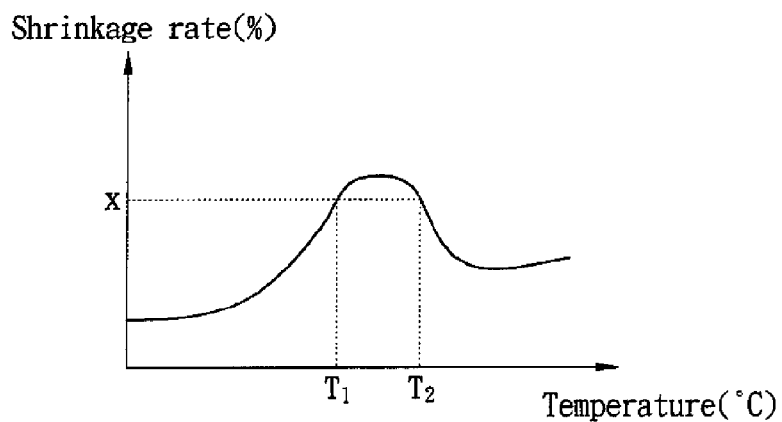
FIG. 2D is a characteristic curves of a pyrocondensation belt of the electric receptacle apparatus according to an exemplary embodiment of the present disclosure.

Please refer to FIG. 2D. FIG. 2D illustrates a characteristic curves of a pyrocondensation belt of the electric receptacle apparatus according to an exemplary embodiment of the present disclosure. The x-axis reflects the temperature T(° C.), and the y-axis reflects the shrinkage rate S(%). The operating temperature range $[T_1, T_2]$ is the temperature range corresponding to the shrinkage rate S equaled to or being higher than the predetermined shrinkage rate x %. The shrinkage rate S would be lower than the predetermined shrinkage rate x % while the temperature of the pyrocondensation belt 249 is higher than or lower than the operating temperature range $[T_1, T_2]$.

The shrinkage rate S could be the transverse shrinkage rate of the pyrocondensation belt 249. The formula of the shrinkage rate S may be shown in equation (1).

$$S = \frac{L_0 - L}{L_0} \times 100\% \qquad (1)$$

Wherein, $L_0$ represents the transverse length of the pyrocondensation belt 249 before shrinkage, and L represents the transverse length of the pyrocondensation belt 249 after the shrinkage rate S meets the predetermined shrinkage rate x %.

When the temperature of the pyrocondensation belt 249 is between the operating temperature range $[T_1, T_2]$, the shrinkage rate S reaches the predetermined shrinkage rate x %. The deformation $(L-L_0)$ of the pyrocondensation belt 249 is as much as enough to move or push the push-pull lever 2461 for blocking the connection of the interior contacts of the switch unit 241.

Figure 3A:
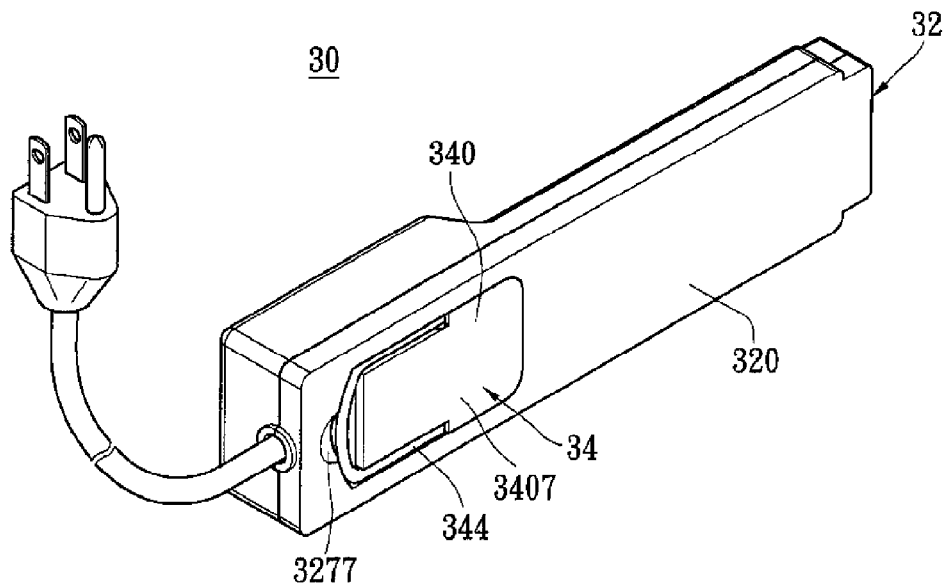
FIG. 3A is a schematic diagram of an electric receptacle apparatus according to a third exemplary embodiment of the present disclosure.

Please refer to FIG. 3A. FIG. 3A is a schematic diagram of an electric receptacle apparatus according to a third exemplary embodiment of the present disclosure.

The electric receptacle apparatus with the replaceable protection module 30 and the electric receptacle apparatus with the replaceable protection module 10 or 20 are roughly the same. The difference between them is the protection module 34 includes a tie bar 344 pivotally connected to the bottom plate 3407 of the casing 340. Further, the body 320 of the receptacle module 32 has a concave edge 3277.

Figure 3B:
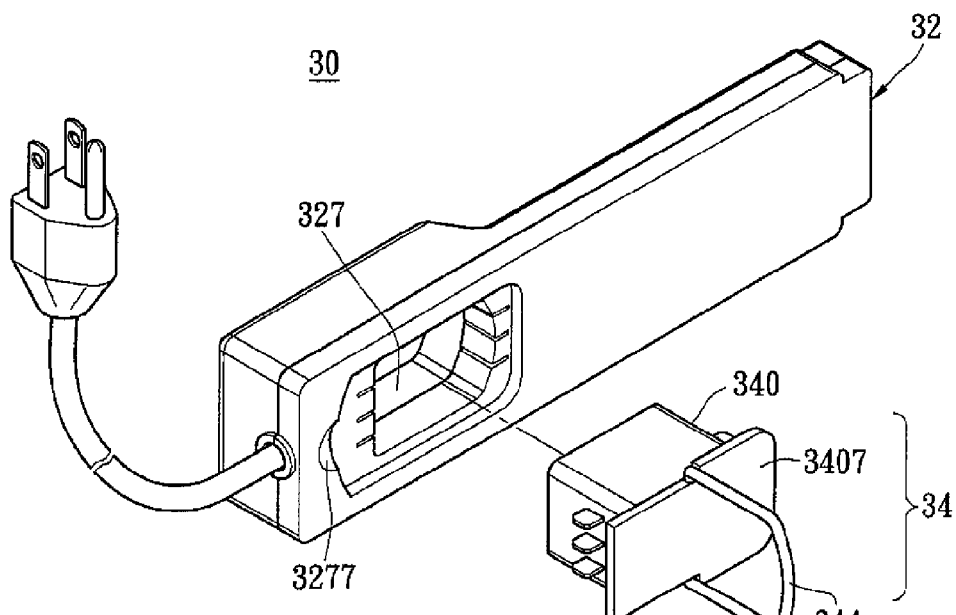
FIG. 3B is another schematic diagram of the electric receptacle apparatus according to the third exemplary embodiment of the present disclosure.

Please refer to FIG. 3A and associated with FIG. 3B. FIG. 3B illustrates another schematic diagram of the electric receptacle apparatus according to the third exemplary embodiment of the present disclosure.

In practice, the concave edge 3277 is adjacent to the accommodation portion 327, and the position on the body 320 where the concave edge 3277 is disposed is corresponding to the position on the bottom plate 3407 where the tie bar 344 is disposed. The concave edge 3277 provides a space for user's hand to separate the protection module 34 from the receptacle module 32 via the tie bar 344.

Figure 4:
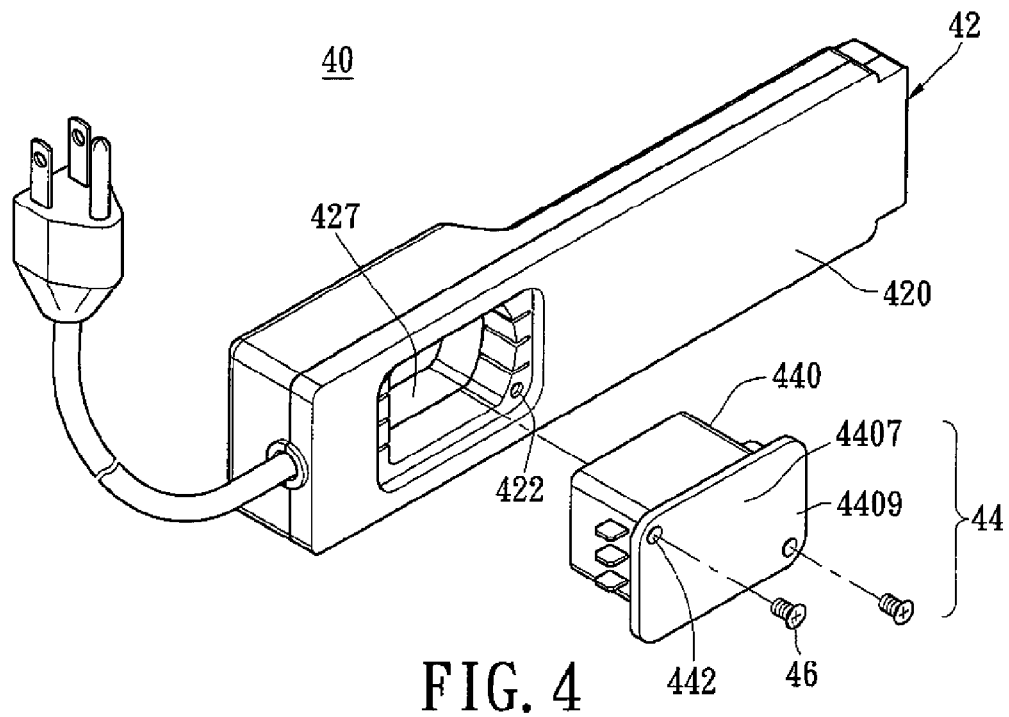
FIG. 4 is a schematic diagram of an electric receptacle apparatus according to a fourth exemplary embodiment of the present disclosure.

Please refer to FIG. 4. FIG. 4 is a schematic diagram of an electric receptacle apparatus according to a fourth exemplary embodiment of the present disclosure.

The electric receptacle apparatus with the replaceable protection module 40 and the electric receptacle apparatus with the replaceable protection module 10 are roughly the same. The difference between them is the body 420 of the receptacle module 42 has a tapped hole 422, and the protection module 44 has a through hole 442 disposed on the bottom plate 4407 of the casing 440.

In practice, the position on the body 420 where the tapped hole 422 is disposed corresponding to the position on the bottom plate 4407 where the through hole 442 is disposed. When the protection module 44 is recessed in the accommodation portion 427 of the receptacle module 42, the through hole 442 is aligned with the trapped hole 422 for a screw 46 passing through. The protection module 44 may be latched in the accommodation module 427 via the screw 46. In one implementation, the through hole 442 is disposed on the flange 4409 of the bottom plate 4407.

Figure 5:
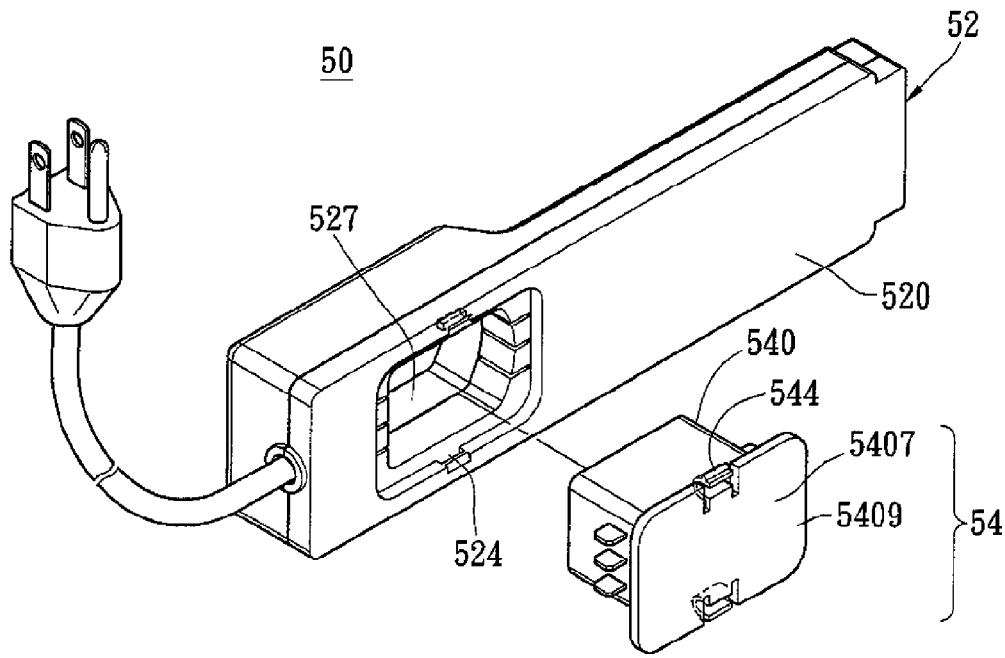
FIG. 5 is a schematic diagram of an electric receptacle apparatus according to a fifth exemplary embodiment of the present disclosure.

Please refer to FIG. 5. FIG. 5 illustrates a schematic diagram of an electric receptacle apparatus according to a fifth exemplary embodiment of the present disclosure.

The electric receptacle apparatus with the replaceable protection module 50 and the electric receptacle apparatus with the replaceable protection module 10 or 20 are roughly the same. The difference between them is the body 520 of the receptacle module 52 has a groove 524, and the protection module 54 has a ridge 544 disposed on the bottom plate 5407 of the casing 540.

In practice, the position on the body 520 where the groove 524 is disposed corresponding to the position on the bottom plate 5407 where the ridge 544 is disposed. In one implementation, the ridge 544 is disposed on the flange 5409 of the bottom plate 5407, and the ridge 544 may be a flexible block.

In practice, the ridge 544 is fastened with or departed from the groove 524 according to the manual. When the ridge 544 is fastened with the groove 524, the protection module 54 is recessed in the accommodation portion 527 firmly.

Figure 6A:
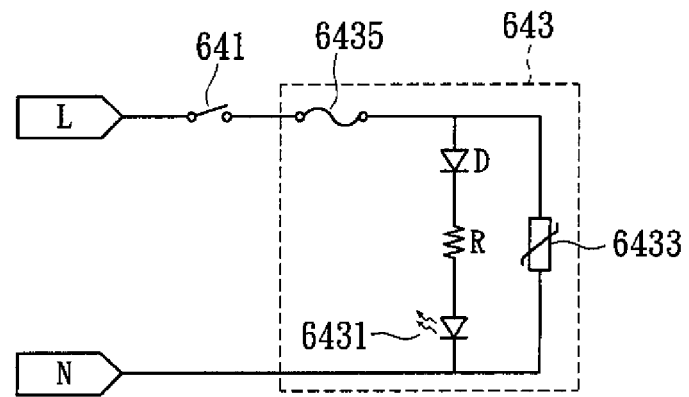
FIG. 6A is a circuit diagram of a protection module of an electric receptacle apparatus according to an exemplary embodiment of the present disclosure.

Please refer to FIG. 6A. FIG. 6A illustrates a circuit diagram of a protection module of an electric receptacle apparatus according to an exemplary embodiment of the present disclosure. The protection circuit 643 is coupled with the power input terminals L and N. In practice, the protection circuit 643 is coupled with the power input terminal L via the switch unit 641.

The protection circuit 643 includes the thermal protection device 6435, surge absorber device 6433, the light-emitting device 6431, a diode device D and a resistor R. The thermal protection device 6435 is coupled with the switch unit 641 and the surge absorber device 6433. The light-emitting device 6431 may be in a serial connection with the diode device D and the resistor R. the light-emitting device 6431 may be in a parallel connection with the surge absorber device 6433. The power output (not shown) may be in a parallel condition with the surge absorber device 6433. In one implementation, the thermal protection device 6435 is a low temperature metal device, and the melting point of the low temperature metal device is consistent with the critical temperature of the surge absorber device 6433.

When the switch unit 641 operates in the on state, the light-emitting device 6431 may emit light in certain wavelength continuously and the protection circuit 643 may absorb the surge from the power input terminal L or N for protecting the electrical device plugged in the power output interface. When the temperature of the surge absorber device 6433 reaches the critical temperature, the thermal protection device 6435 may be melted for preventing the surge absorber device 6433 being on fire, and the light-emitting device 6431 does not emit light for indicating the condition of the protection circuit 643.

Figure 6B:
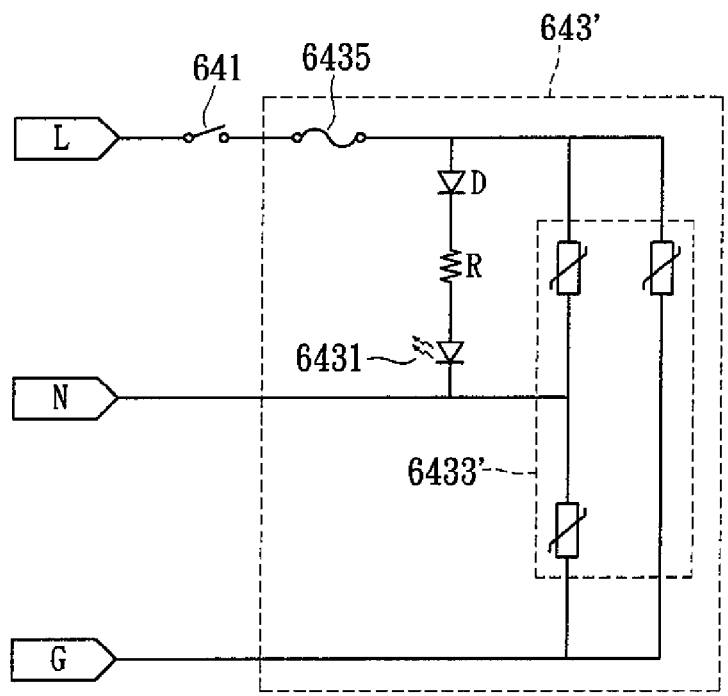
FIG. 6B is a circuit diagram of a protection module of an electric receptacle apparatus according to another exemplary embodiment of the present disclosure.

Please refer to FIG. 6B. FIG. 6B illustrates a circuit diagram of a protection module of an electric receptacle apparatus according to another exemplary embodiment of the present disclosure.

The protection circuit 643' and the protection circuit 643 are roughly the same. The difference between them is the protection circuit 643' may be further coupled with the ground terminal G. The surge absorber device 6433' includes at least three surge absorber units. The thermal protection device 6435 may be melted when any one of the surge absorber units is failed.

To sum up, the exemplary embodiments according to the present disclosure relate to the electric receptacle apparatus capable of protecting the electrical device plugged in the receptacle apparatus. Further, the electric receptacle apparatus has a detachable protection module, and the switch unit is disposed on the protection module, so as to remove the switch unit together with the protection module.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. An electric receptacle apparatus with replaceable protection module, comprising:
   a receptacle module, having a body, an accommodation portion, a power input interface and a power output interface, wherein the power input interface is configured to receive a power, the power output interface is configured to output the power, the power input interface and the power output interface are disposed on the body, and the accommodation portion is installed inside the body and the accommodation portion having a plurality of conductive jacks, wherein the conductive jacks are electrically connected with the power input interface and the power output interface respectively; and
   a protection module, detachably disposed in the accommodation portion, in which the protection module has a casing, a switch unit, a protection circuit and a plurality of conductive terminals, wherein the protection circuit is installed in the casing for protecting an electrical device plugged in the power output interface, and the switch unit connected with the protection circuit and the conductive terminals;
   whereby, when the protection module is recessed in the accommodation portion, the conductive terminals are plugged in the conductive jacks and the switch unit controls the power input interface to be electrically connected with or electrically disconnected from the power output interface for controlling the power output interface to start to output the power or stop outputting the power.

2. The electric receptacle apparatus as in claim 1, wherein the protection circuit comprises a surge absorber device for absorbing a surge from the power input interface.

3. The electric receptacle apparatus as in claim 2, wherein the protection circuit further comprises a thermal protection device connected with the surge absorber device and the switch unit, in which the thermal protection device melts when the temperature of the surge absorber device reaches a critical temperature which the surge absorber device is failed.

4. The electric receptacle apparatus as in claim 3, wherein the protection circuit further comprises a light-emitting device connected with the surge absorber device and the thermal protection, in which the light-emitting device is configured to indicate the operation state of the surge absorber and does not emit light when the temperature of the surge absorber device reaches the critical temperature.

5. The electric receptacle apparatus as in claim 1, wherein the casing has a plurality of perforations, in which the conductive terminals protrudes from the inside of the casing to the outside of the casing through the perforations.

6. The electric receptacle apparatus as in claim 1, wherein the protection module further comprises a circuit board disposed inside the casing, in which the switch unit, the protection circuit and the conductive terminals are disposed on the circuit board.

7. The electric receptacle apparatus as in claim 1, wherein the casing comprising a lid and a bottom plate, in which the lid joints with the bottom plate, and when the protection module is disposed in the accommodation portion, the lid is recessed in the accommodation portion and the bottom plate is contacted with a base of the body.

8. The electric receptacle apparatus as in claim 7, wherein the conductive terminals are protruded from the lid horizontally with respect to the bottom plate.

9. The electric receptacle apparatus as in claim 7, wherein the conductive terminals are protruded from the lid perpendicularly with respect to the bottom plate.

10. The electric receptacle apparatus as in claim 7, wherein the body has a tapped hole and the bottom plate has a through hole, in which the through hoe is aligned with the tapped hole when the bottom plate is contacted with the base, whereby the protection module is latched with the receptacle module via a screw.

11. The electric receptacle apparatus as in claim 7, wherein the base has a groove and the bottom plate has a ridge, in which the ridge is fastened with the groove when the lid is recessed in the accommodation portion.

12. The electric receptacle apparatus as in claim 1, wherein the protection module further comprises a tie bar pivotally connected to the casing.

13. The electric receptacle apparatus as in claim 12, wherein the body has a concave edge, in which the first position on the body where the concave edge is disposed is corresponding to the second position on the casing where the tie bar is disposed.

14. An electric receptacle apparatus with replaceable protection module, comprising:
   a receptacle module, having an accommodation portion, wherein the accommodation portion has a plurality of conductive jacks coupled with a power input interface and a power output interface; and
   a protection module, having a plurality of conductive terminals coupled with a switch unit and a surge absorber device, wherein the conductive terminals protrude from the inside to the outside of the casing of the protection module, and the conductive terminals are plugged in the conductive jacks respectively when the protection module is recessed in the accommodation portion.

15. An electric receptacle apparatus with replaceable protection module, comprising:
- a receptacle module, having an accommodation portion, wherein the accommodation portion has a plurality of conductive jacks coupled with a power input interface and a power output interface; and
- a protection module, having a plurality of conductive terminals and a pyrocondensation belt, wherein the conductive terminals are electrically coupled with a switch unit and a surge absorber device, the pyrocondensation belt connected with the surge absorber device and an insulating member, and the conductive terminals protrudes from the inside to the outside of the casing of the protection module, when the protection module is recessed in the accommodation portion, the conductive terminals are plugged in the conductive jacks, and when the shrinkage degree of the pyrocondensation belt develops enough to drive the insulating member to block the switch unit from being operated in the on state for stopping the power output interface outputting the power.

16. The electric receptacle apparatus in claim 15, wherein the protection module is latched with the receptacle module via a screw.

17. The electric receptacle apparatus in claim 15, wherein the protection module has a ridge and the receptacle module has a groove, in which the ridge is fasten with the groove when the protection module is recessed in the receptacle module.

\* \* \* \* \*